(12) United States Patent
Sano

(10) Patent No.: US 6,243,147 B1
(45) Date of Patent: Jun. 5, 2001

(54) LIQUID CRYSTAL DISPLAY APPARATUS CAPABLE OF PREVENTING A BREAK DUE TO A CRACK CAUSED DURING A MANUFACTURING PROCESS

(75) Inventor: Takeshi Sano, Ashigara (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/330,055

(22) Filed: Jun. 11, 1999

(30) Foreign Application Priority Data

Jun. 18, 1998 (JP) .................................................. 10-170830

(51) Int. Cl.$^7$ ......................... G02F 1/1333; G02F 1/1345
(52) U.S. Cl. ................................ 349/58; 349/59; 349/60; 349/149; 349/150; 349/151; 349/152
(58) Field of Search ..................................... 349/149–152, 349/58–60

(56) References Cited

U.S. PATENT DOCUMENTS

| | | | |
|---|---|---|---|
| 5,363,227 | * 11/1994 | Ichikawa et al. | 349/60 |
| 5,486,942 | * 1/1996 | Ichikawa et al. | 349/60 |
| 5,629,787 | * 5/1997 | Tsubota et al. | 349/153 |
| 5,808,707 | * 9/1998 | Niibori et al. | 349/60 |
| 5,933,206 | * 8/1999 | Niibori et al. | 349/60 |

FOREIGN PATENT DOCUMENTS 0704369   2/1995   (JP) .

* cited by examiner

*Primary Examiner*—William L. Sikes
*Assistant Examiner*—Julie Ngo
(74) *Attorney, Agent, or Firm*—Oblon, Spivak, McClelland, Maier & Neustadt, P.C.

(57) ABSTRACT

A novel liquid crystal display apparatus includes a substrate kit and an assembling member. The substrate kit includes first and second polymer substrates on which electrodes are mounted and which are deposited in parallel in a horizontal direction such that the electrodes face each other. A sealing member is deposited around a circumference of the first and second polymer substrates such that a sealed space is made by the electrodes and the sealing member. The first polymer substrate forms a substrate extension extending outwards in a horizontal plane and the electrode bonded on the first polymer substrate forms an electrode extension extending along the substrate extension. The substrate kit further includes liquid crystal sealed inside the sealed space, polarizing seals bonded on each of the pair of polymer substrates on sides opposite to the sides having the electrodes, and an assembling member on which the substrate kit is mounted. In such a liquid crystal display apparatus, at least a portion of the electrode extension is bent in a direction towards the second polymer substrate before the substrate kit is mounted on the assembling member.

18 Claims, 6 Drawing Sheets

LIQUID CRYSTAL DISPLAY APPARATUS CAPABLE OF PREVENTING A BREAK DUE TO A CRACK CAUSED DURING A MANUFACTURING PROCESS

BACKGROUND OF THE INVENTION

1. Field of the Invention

The present invention relates generally to a liquid crystal display apparatus, and more particularly to a liquid crystal display apparatus which is capable of preventing a break due to a crack caused during a manufacturing process.

2. Discussion of the Background

A liquid crystal display apparatus, an important man-machine communications device, is used in a variety of electronic devices such as electronic watches, personal digital assistant (PDA) systems, word processors, copying machines, facsimile machines, and so on. In the liquid crystal display apparatus, a polymer substrate has been widely employed in place of a glass substrate. Utilizing a polymer substrate is a known technique and is described in, for example, Japanese Laid-Open Patent Application No. 07-043697 (1995) referring to an exemplary structure of a liquid crystal display apparatus shown in FIG. 1. The liquid crystal display apparatus of FIG. 1 has a typical structure which includes a pair of polymer substrates 1 and 2, indium-tin oxide (ITO) electrodes 3 and 4, a sealing member 5, a liquid crystal 6, and polarizing seals 10 and 11. The ITO electrodes 3 and 4 are bonded on the sides of the polymer substrates 1 and 2 to face each other. The sealing member 5 is deposited between the ITO electrode films 3 and 4 around the edge of the ITO electrode film 3 so that the liquid crystal 6 is sealed therein. In the liquid crystal display apparatus having the structure mentioned above, the liquid crystal 6 is energized to display information in a form of alphanumeric symbols, for example, by applying an electrical current to the ITO electrodes 3 and 4.

In general, a liquid crystal display apparatus having the above-described structure is used as part of an electronic device (not shown), for example, and is therefore mounted inside a housing or the like of the electronic device. FIG. 1 shows a connecting portion of the electronic device and the liquid crystal display apparatus. The electronic device includes a connecting member 7, a solder 8, bumps 8a, and an electrode 9. The connecting member 7 is extended from a circuit substrate (not shown) or the like of the electronic device to supply power to the liquid crystal display apparatus. For this purpose, an extension 2a is extended from the polymer substrate 2 and an electrode extension 4a is extended from the ITO electrode 4 along the extension 2a.

To electrically connect the electrode extension 4a to the connecting member 7, the electrode extension 4a is typically pressed against the connecting member 7 and is then soldered with the solder 8, which is deposited together with the bumps 8a between the electrode 9 bonded on the bottom of the connecting member 7 and the electrode extension 4a.

However, the above-mentioned way of connecting the liquid crystal display apparatus to the electronic device provides a stress to the electrode extension 4a on the electrode 4 or to the electrode extension 4a at a position under the sealing member 5, which may generate a crack 12. This may eventually cause a failure of electrical connection between the liquid crystal display apparatus and the circuit substrate of the electronic device. As a result, the liquid crystal cannot properly display information. This kind of error may be caused not only when the electrode extension 4a is connected to the connecting member 7 using heat and pressure, but also when the electrode extension 4a receives an excessive stress during the installation of the liquid crystal display to the electronic device.

One technique for preventing this problem is to extend the polarizing seal 11 to cover the length of the extension of the polymer substrate 2a so as to support the electrode extension 4a. However, this technique is not sufficient because such a technique would be effective only after the extended polarizing seal 11 is attached and the electrode extension 4a may receive a stress and may be bent, as shown by dotted lines in FIG. 2, before the extended polarizing seal 11 is attached.

SUMMARY OF THE INVENTION

Accordingly, an object of the present invention is to provide a novel liquid crystal display apparatus which eliminates the unstable connection problems as discussed above.

To achieve this object and other objects, a novel liquid crystal display apparatus of the present invention includes a substrate kit and an assembling member. The substrate kit includes first and second polymer substrates, each of which has an electrode on an entire surface of one side thereof. The first and second polymer substrates are deposited in parallel in a horizontal direction such that the electrodes face each other, and have a sealing member deposited therebetween around a circumference thereof such that a sealed space is made by the electrodes and the sealing member. The first polymer substrate forms a substrate extension extending outwards in a horizontal plane and the electrode bonded on the first polymer substrate forms an electrode extension extending along the substrate extension.

The substrate kit further includes a liquid crystal which is sealed inside the sealed space, polarizing seals bonded on each of the pair of polymer substrates on a side opposite to the side having the electrode, and an assembling member on which the substrate kit is mounted. In such a liquid crystal display apparatus, at least a portion of the electrode extension is bent in a direction towards the second polymer substrate before the substrate kit is mounted on the assembling member.

The polarizing seal bonded on the first polymer substrate may be extended approximately to an end of the substrate extension.

The electrode extension may be bent at an angle from 2 degrees to 20 degrees, or with a radius of curvature in a range of 10 mm to 100 mm.

Further, the assembling member may include a supporting frame for supporting the apparatus. The supporting frame may have a surface contacting the second polymer substrate and a rise at one end which engages a rim of the electrode extension such that the electrode extension is bent in a direction towards the second polymer substrate.

Further, the assembling member may include a supporting frame for supporting the apparatus. The supporting frame may include a surface contacting the first polymer substrate and, at one end, a slope having an angle from 2 degrees to 20 degrees. In this case, the slope is used to bend the electrode extension in a direction towards the second polymer substrate.

Further, when the apparatus mounted on the assembling member is installed in a different housing, a part of the different housing may hold the assembling member so as to secure the electrode extension.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
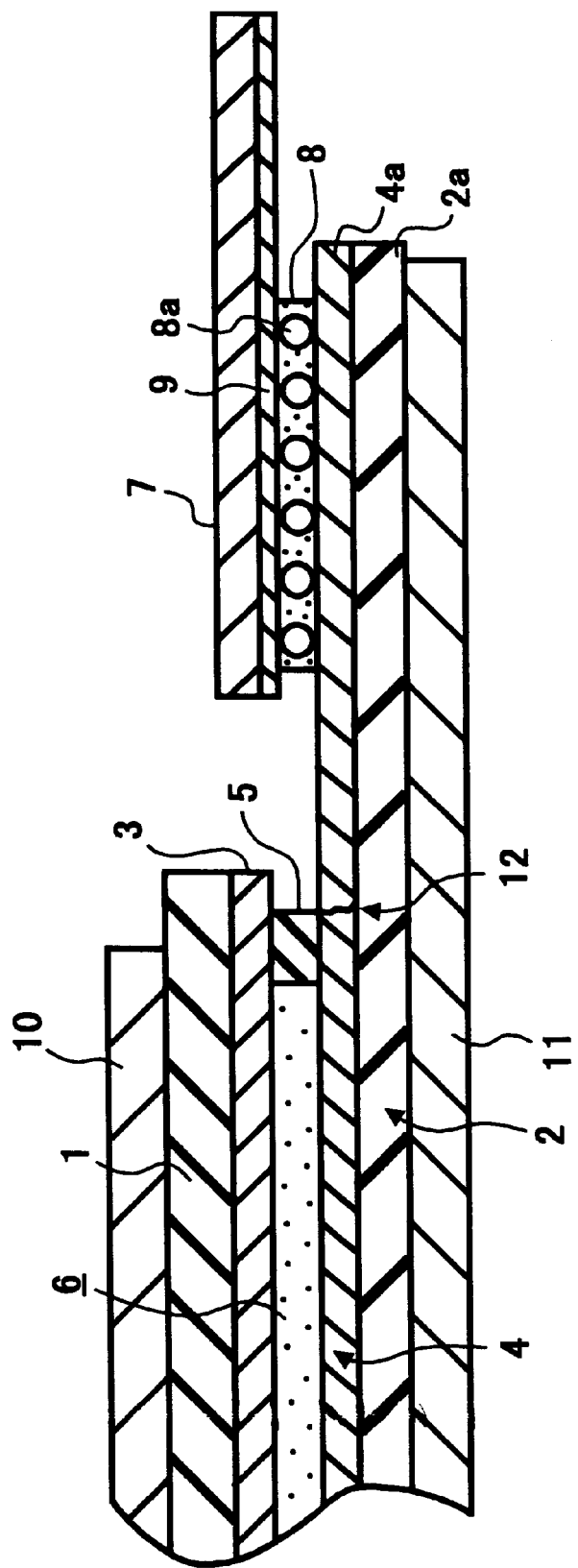
FIGS. 1 and 2 are illustrations for explaining a typical structure of a liquid crystal display of a backgound art.
Figure 2:
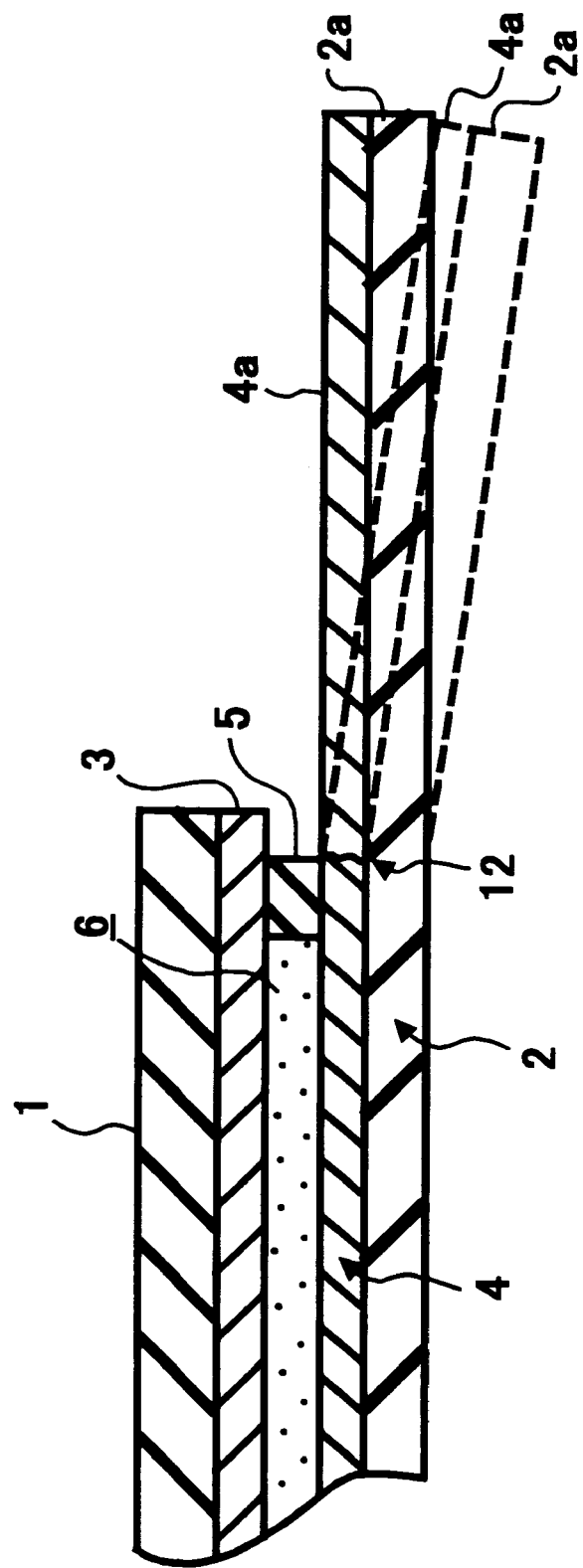

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 3:
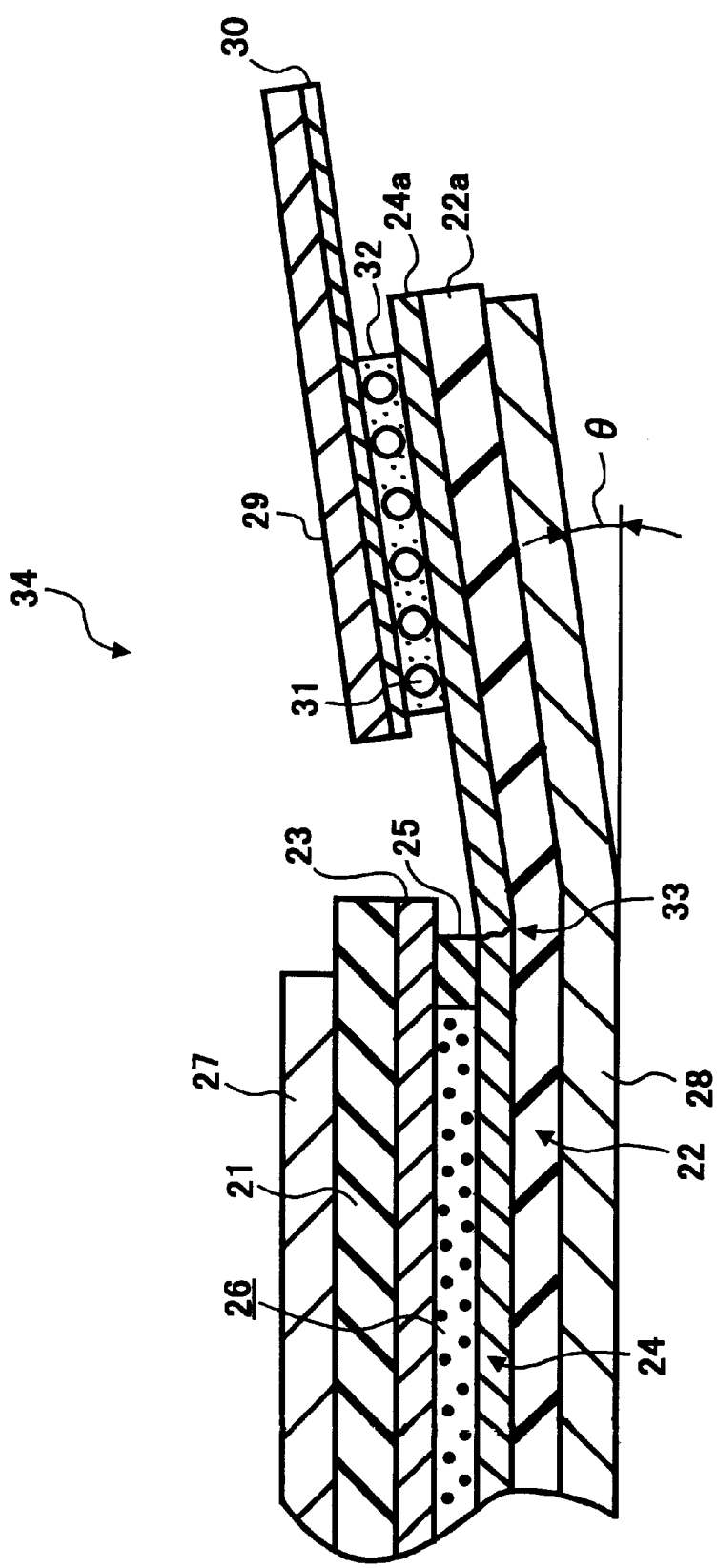
FIG. 3 if an illustration for explaining an exemplary structure of a liquid crystal display apparatus having extensions of a substrate, electrode, and polarizing seal with a slope having a predetermined angle, according to an embodiment of the present invention.

Referring now to the drawings, wherein like reference numerals designate identical or corresponding parts throughout the several views, and more particularly to FIG. 3 thereof, there is illustrated an exemplary structure of a liquid crystal display apparatus 34 according to an embodiment of the present invention. While FIG. 3 shows an edge portion of the liquid crystal display 34, the entire apparatus has a box shape although it is not shown.

In FIG. 3, the liquid crystal display 34 includes a pair of polymer substrates 21 and 22, ITO (indium-tin oxide) electrodes 23 and 24, a sealing member 25, a liquid crystal 26, and a pair of polarizing seals 27 and 28. The ITO electrodes 23 and 24 are bonded to the polymer substrates 21 and 22, respectively, such that the ITO electrodes 23 and 24 face each other with a distance to form a space for holding the liquid crystal 26 therebetween. Both of the polymer substrates 21 and 22 have a side in the vertical direction of the drawing, along which the sealing member 25 is disposed so as to seal the liquid crystal 26 held in the space between the electrodes 23 and 24.

When an electric current passes through the electrodes 23 and 24 configured in the above-mentioned way, the liquid crystal 26 is energized and displays information in a predetermined form, such as alphanumeric symbols or the like.

The polarizing seals 27 and 28 are also bonded to the polymer substrates 21 and 22, respectively, on sides of the polymer substrates 21 and 22 opposite to those having the electrodes 23 and 24, as shown in FIG. 3. The polarizing seals 27 and 28 may be substituted by semi-transparent seals or reflective seals.

The polymer substrate 22 forms at one end a substrate extension 22a which extends in an external direction over the sealing member 25. Along the substrate extension 22a, the electrode 24 also forms an electrode extension 24a for a predefined length. Also, the polarizing seal 28 extends its end along the substrate extension 22a nearly to the ends of the substrate extension 22a and the electrode extension 24a.

The electrode extension 24a which extends from the electrode 24 over the sealing member 25 is bent at a portion around the sealing member 25, e.g., slightly outside the sealing member 25, in a direction towards the polymer substrate 21 with an angle θ, which may be in the 2-degree to 20-degree range. Such a bent electrode extension 24a is installed in an assembling frame (explained later). The electrode 24 may alternatively be bent around its mid portion or any portion other than the portion around the sealing member 25.

The electrode extension 24a is electrically connected, e.g., via bumps 31 to an electrode 30 of a connecting member 29 which is a part of a heat seal connector or the like mounted on a circuit substrate (not shown). The electrode 30 is fixed to the electrode extension 24a with, e.g., a solder 32. Accordingly, the electrode 24 is connected to the connecting member 29 through the electrode extension 24a and can be applied with a power therethrough to cause the liquid crystal 26 to display information in a form such as alphanumeric symbols or the like.

In the present embodiment, the liquid crystal display apparatus 34 with the electrode extension 24a being bent with the angle θ within the 2-degree to 20-degree range allowance is assembled in an assembling frame. Then, the electrode extension 24a is made to contact the connecting member 29 via the bumps 31 with a pressure, and heat is applied to melt the solder between the electrode 30 and the electrode extension 24a. Thereby, the electrode extension 24a is connected to the connecting member 29.

In this way, the liquid crystal display apparatus 34 can be installed in the assembling frame with the electrode extension 24a which has previously been bent towards the polymer substrate 21 relative to the surface of the electrode 24. Accordingly, when the liquid crystal display apparatus 34 is installed in the assembling frame, the electrode extension 24a is positioned at a place where it can contact the electrode 30 of the connecting member 29 without causing a mechanical stress thereon. Accordingly, the electrode extension 24a can be connected safely with the connecting member 29. Even if a crack 33 occurs on the portion of the electrode 24 or the electrode extension 24a where the bend is made, the electrode extension 24a can be connected safely with the connecting member 29 since the electrode extension 24a will not receive a stress during the connecting process. As a result, the electrical connection can be made stably between the electrode 30 of the connecting member 29 and the electrode extension 24a, which avoids a failure in displaying information.

As described above, the polarizing seal 28 also has an extended portion with the predetermined angle θ. This extended portion supports the electrode extension 24a from the bottom thereof, protecting the electrode extension 24a from being bent to an extent exceeding a predetermined angle and from generating the crack 33 around the portion being bent.

As also described above, the electrode extension 24a is bent with the angle θ within the 2-degree 20-degree range, thereby making good contact with the electrode 30 of the connecting member 29 even if the electrode extension 24a has the crack 33 at the portion where the bend is made. The experimental reasons for predetermining the angle θ within the 2-degree to 20-degree range are as follows. With the angle θ smaller than 2 degrees, the electrode extension 24a may need to be bent at a further angle during the process of connecting to the connecting member 29. In this case, if the crack 33 already exists, such a crack 33 may become greater and, as a result, the electrode extension 24a may not make good contact with the electrode 30. With the angle θ greater than 20 degrees, the electrode extension 24a may need to be bent back during the process of connecting to the connecting member 29. In this case, if the crack 33 already exists, such a crack 33 may become greater and, as a result, the electrode extension 24a may not make good contact with the electrode 30. Accordingly, the safety range of the angle θ is in the 2-degree to 20-degree range. This range may be expanded in certain cases, e.g. based on materials used for the elements. However, from a practical view point, it is more preferable to set the angle θ to a degree within a 5-degree to 15-degree range.

Figure 4:
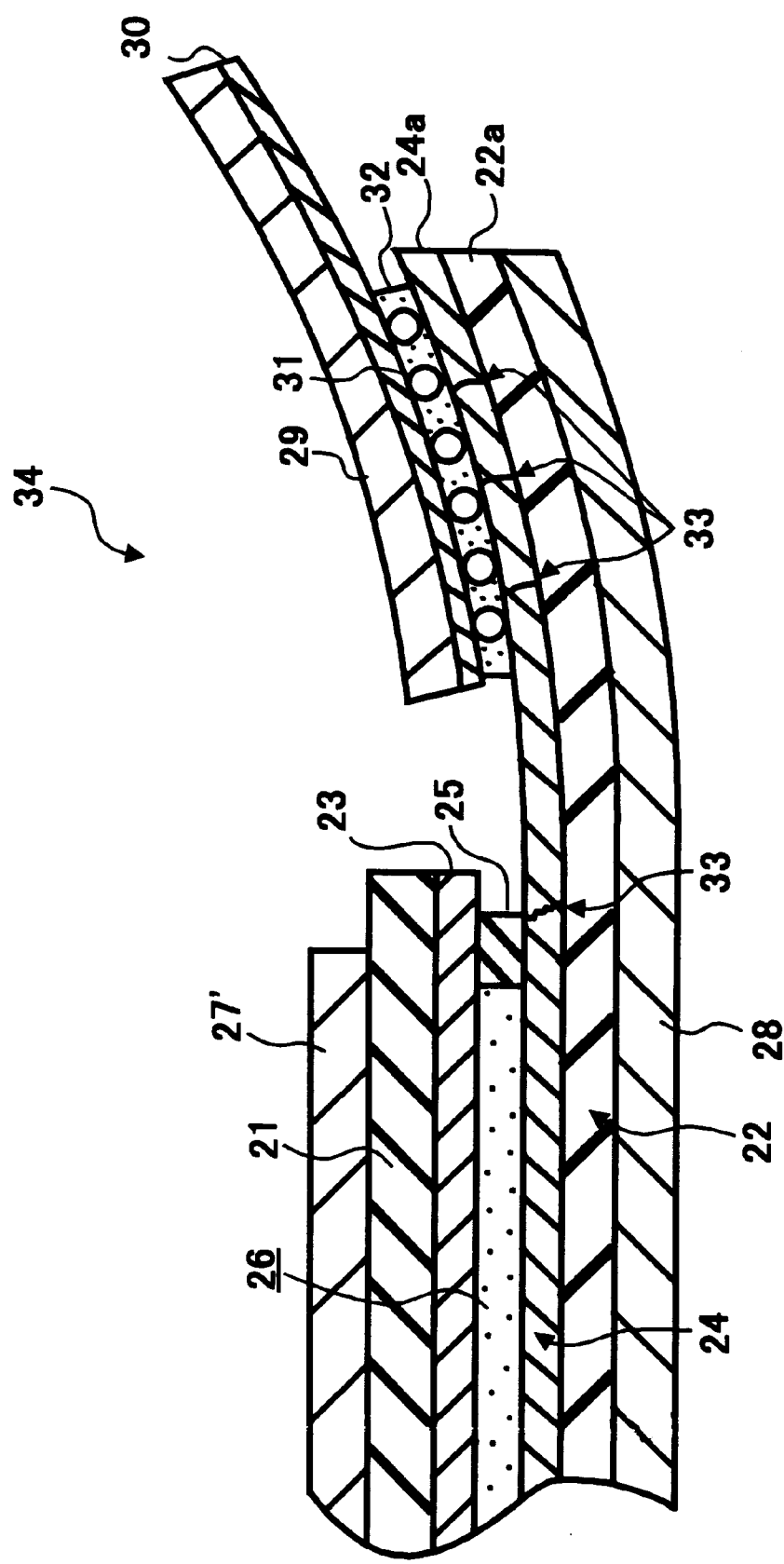
FIG. 4 is an illustration for explaining an exemplary structure of a liquid crystal display apparatus having extensions of a substrate, electrode, and polarizing seal with a curve having a predetermined radius of curvature, according to an embodiment of the present invention.

Alternative to the way of bending in which the electrode extension 24a is bent linearly, as shown in FIG. 3, the electrode extension 24a can be bent with a curve having a radius of curvature within a range from 10 mm to 100 mm, as shown in FIG. 4. This alternative bending way provides a margin to the connecting tension between the electrode extension 24a and the connecting member 29. Therefore, the electrode extension 24a can maintain a good contact with the electrode 30 of the connecting member 29 against an external stress even if the electrode extension 24a has the pre-formed crack 33 around the portions close to the sealing member 25 and/or the bumps 31 as well as the melted solder 32, as shown in FIG. 4. As described above, the range from 10 mm to 100 mm is the safety range of curvature radius. However, from a practical view point, it is more preferable to set the radius of curvature within a 15 mm to 50 mm range.

Figure 5:
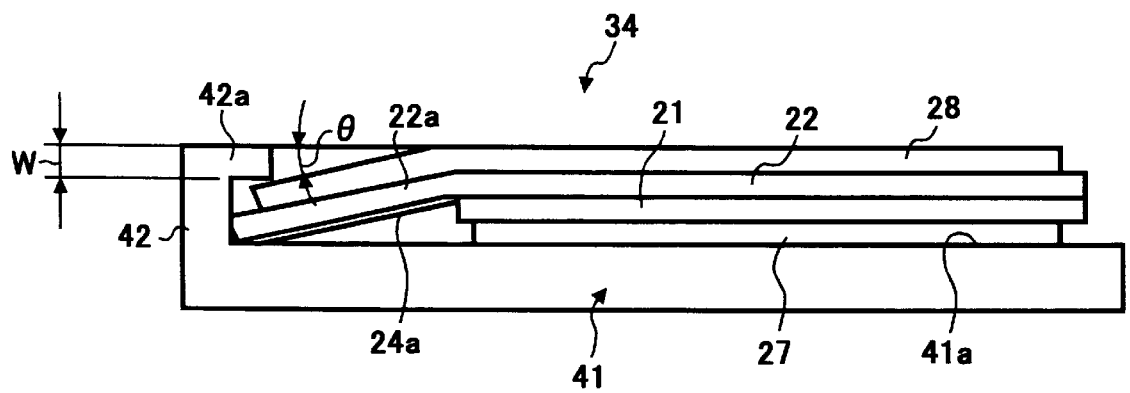
FIGS. 5–7 illustrations each for explaining a way of mounting the liquid crystal display apparatus on an assembling frame.

Next, a first example of an assembling frame which supports the liquid crystal display apparatus 34 is explained with reference to FIG. 5. In FIG. 5, reference numeral 41 denotes an assembling frame which supports the liquid crystal display apparatus 34. The assembling frame 41 includes a contact surface 41a which contacts the side of the polymer substrate 21 of the liquid crystal display apparatus 34. The assembling frame 41 further includes a side end 42 on which a pawl 42a is formed, as shown in FIG. 5.

In FIG. 5, the liquid crystal display apparatus 34 and a back light mechanism (not shown) using, e.g., an LED (light-emitting diode) or an EL (electroluminescence) are assembled in the assembling frame 41, and then the electrode extension 24a is engaged in the pawl 42a so that the electrode extension 24a is bent in the direction towards the side of the polymer substrate 21. With this structure, the electrode extension 24a can be bent easily without requiring extra steps during the manufacturing procedure. As a result, the number of the assembling steps of the liquid crystal display apparatus 34 can be prevented from increasing.

In the assembling frame 41 of FIG. 5, the electrode extension 24a is set to the angle of 4 degrees when the length of the electrode extension 24a is 2.7 mm and when the pawl 42a is bent in the direction towards the side of the polarizing seal 27 so that the bottom surface of the pawl 42a is lowered 0.2 mm relative to the polarizing seal 27.

Figure 6:
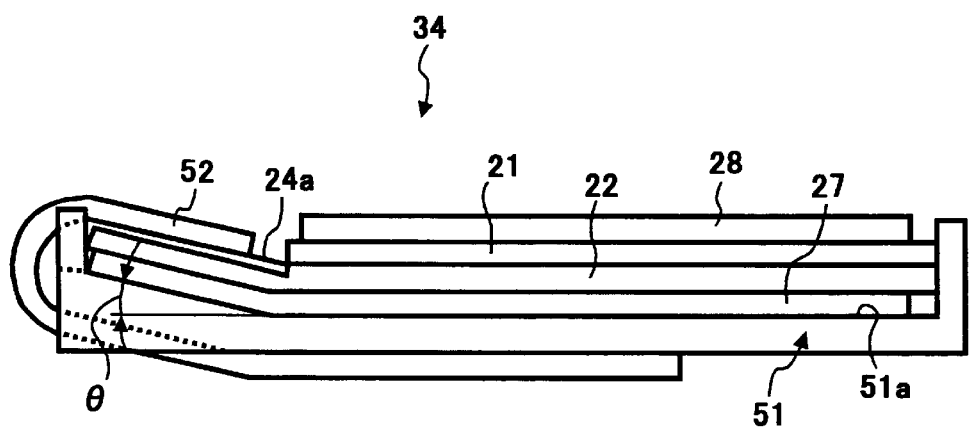

Next, a second example of an assembling frame which supports the liquid crystal display apparatus 34 is explained with reference to FIG. 6. In FIG. 6, reference numeral 51 denotes an assembling frame which supports the liquid crystal display apparatus 34. The assembling frame 51 includes a contact surface 51a which contacts the side of the polymer substrate 22 of the liquid crystal display apparatus 34. The contact surface 51a has at one end a slope having an angle θ within a range from 2 degrees to 20 degrees.

With this structure, when the liquid crystal display apparatus 34 is installed in the assembling frame such that the side of the polymer substrate 22 faces the side of the contact surface 51a, the electrode extension 24a is placed on this slope of the contact surface 51a and is accordingly bent in the direction towards the polymer substrate 21.

After the above-described installation, the liquid crystal display apparatus 34 is fixed to the assembling frame 51 by a fixing member 52 which supports the assembling frame from the bottom thereof and the electrode extension 24a from the top.

With this structure, the electrode extension 24a can be bent easily without requiring extra steps during the manufacturing procedure. As a result, the number of the assembling steps of the liquid crystal display apparatus 34 can be prevented from increasing.

Figure 7:
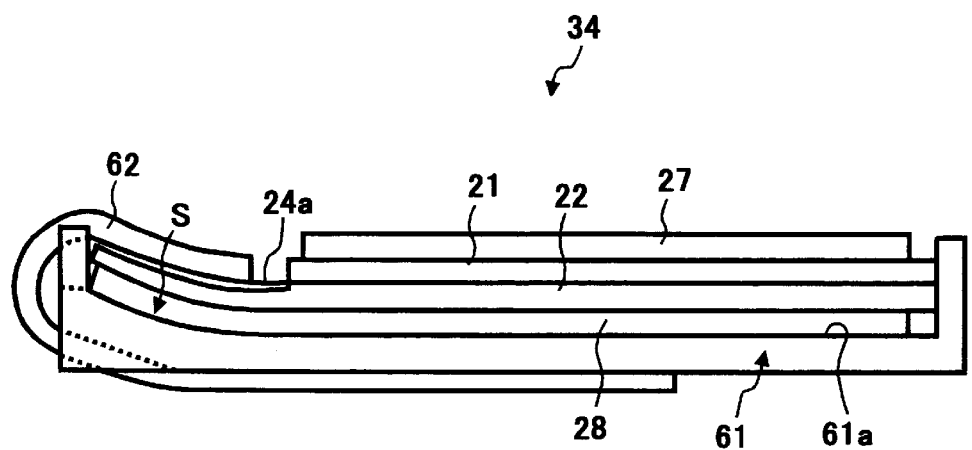

Next, a third example of an assembling frame which supports the liquid crystal display apparatus 34 is explained with reference to FIG. 7. In FIG. 7, reference numeral 61 denotes an assembling frame which supports the liquid crystal display apparatus 34. The assembling frame 61 includes a contact surface 61a which contacts the side of the polymer substrate 22 of the liquid crystal display apparatus 34. The contact surface 61a has at one end a curving slopel having a curvature radius S within a range from 10 mm to 100 mm.

With this structure, when the liquid crystal display apparatus 34 is installed in the assembling frame such that the side of the polymer substrate 22 faces the side of the contact surface 61a, the electrode extension 24a is placed on this curving slope of the contact surface 61a and is accordingly bent in the direction towards the polymer substrate 21.

After the above-described installation, the liquid crystal display apparatus 34 is fixed to the assembling frame 61 by a fixing member 62 which supports the assembling frame from the bottom thereof and the electrode extension 24a from the top.

With this structure, the electrode extension 24a can be bent easily without the need of extra steps during the manufacturing procedure. As a result, the number of the assembling steps of the liquid crystal display apparatus 34 can be prevented from increasing.

Figure 8:
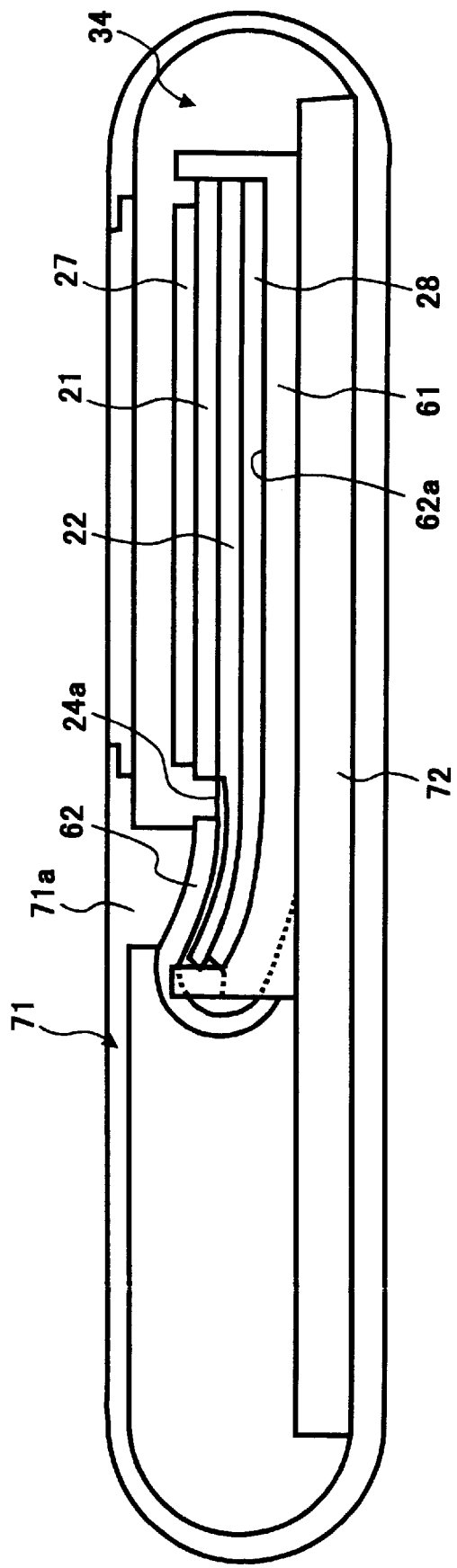
FIG. 8 is an illustration for explaining an exemplary structure in which the liquid crystal display apparatus according to the present invention and mounted on an assembling frame is installed inside a console panel of a copying machine.

Next, an exemplary structure of a machine console where the liquid crystal display apparatus 34 is installed is explained with reference to FIG. 8. In FIG. 8, reference numeral 71 denotes a console of a machine such as a copying machine, a facsimile machine, or the like, in which the liquid crystal display apparatus 34 assembled in the assembling frame 61 is installed. The console 71 includes a printed circuit board (PCB) 72 at the inside bottom thereof, and a supporting member 71a which extends from the upper interior wall of the console 71 and holds down the electrode extension 24a.

With this structure, the liquid crystal display apparatus 34 can be fixed in the console without requiring extra parts for holding down the fixing member 62. Accordingly, it becomes possible to minimize the distance between the console 71 and the liquid crystal display apparatus 34 inside the console 71. As a result, the console 71 can be made thinner.

In addition, with the above-described structure, the liquid crystal display apparatus 34 can be fixed to the fixing member 62 without using a dual-sided adhesive tape or the like. Accordingly, the number of the assembling steps of the liquid crystal display apparatus 34 can be prevented from increasing.

Obviously, numerous additional modifications and variations of the present invention are possible in light of the above teachings. It is therefore to be understood that within the scope of the appended claims, the present invention may be practiced otherwise than as specifically described herein.

This document claims the priority rights of and is based on the subject matter described in Japanese patent application JPAP 10-170830 filed on Jun. 18, 1998, in the Japanese Patent Office, the entire contents of which are hereby incorporated by reference.

What is claimed is:

1. A liquid crystal display apparatus, comprising:
    a substrate kit which comprises:
        first and second polymer substrates, each having an electrode on a surface of a first side thereof, wherein said first side of each of said first and second polymer substrates face each other;
        a sealing member deposited around a circumference of said first and second polymer substrates to form a sealed space;
        wherein said first polymer substrate forms a substrate extension and said electrode is bonded on said first side of said first polymer substrate for forming an electrode extension extending along said substrate extension;
        a liquid crystal sealed inside said sealed space; and
        a polarizing seal bonded on a second side of each of said first and second polymer substrates opposite to the first sides having said electrode; and
    an assembling member on which said substrate kit is mounted;
    wherein at least a portion of said electrode extension is bent in a direction towards said second polymer substrate before said substrate kit is mounted on said assembling member.

2. A liquid crystal display apparatus as defined in claim 1, wherein said polarizing seal bonded on said first polymer substrate is extended approximately to an end of said substrate extension.

3. A liquid crystal display apparatus as defined in claim 1, wherein said electrode extension is bent at an angle from 2 degrees to 20 degrees.

4. A liquid crystal display apparatus as defined in claim 1, wherein said electrode extension is bent with a radius of curvature in a range of 10 mm to 100 mm.

5. A liquid crystal display apparatus as defined in claim 1, wherein said assembling member includes a supporting frame, assembling frame having a surface contacting said second polymer substrate and a rise at one end which engages a rim of said electrode extension such that said electrode extension is bent in a direction towards said second polymer substrate.

6. A liquid crystal display apparatus as defined in claim 1, wherein said assembling member includes a supporting frame, assembling frame including a surface contacting said first polymer substrate and, at one end, having a slope an angle from 2 degrees to 20 degrees, said slope bending said electrode extension in a direction towards said second polymer substrate.

7. A liquid crystal display apparatus as defined in claim 6, wherein said assembling member includes a housing configured to secure said electrode extension.

8. A liquid crystal display apparatus as defined in claim 1, wherein said assembling member includes a supporting frame, assembling frame including a surface contacting said first polymer substrate and, at one end, having a curve a radius of curvature in a range of 10 mm to 100 mm, said curve bending said electrode extension in a direction towards said second polymer substrate.

9. A liquid crystal display apparatus as defined in claim 8, wherein said assembling member includes a housing configured to secure said electrode extension.

10. A liquid crystal display apparatus, comprising:
    substrate unit means which comprises:
        first and second substrate means facing each other;
        sealing means forming a sealed space around said first and second substrate means, said first and second substrate means and sealing means for forming a sealed space;
        wherein said first substrate means forms a substrate extension means for providing an electrical connection to said substrate unit means;
        liquid crystal means; and
        polarizing means bonded on sides of each of said first and second substrate means; and
    assembling means on which said substrate unit means is mounted;
    wherein at least a portion of said substrate extension means is bent in a direction towards said second substrate means before said substrate unit means is mounted on said assembling means.

11. A liquid crystal display apparatus as defined in claim 10, wherein said polarizing means bonded on said first substrate means is extended approximately to an end of said substrate extension means.

12. A liquid crystal display apparatus as defined in claim 10, wherein said substrate extension means is bent at an angle from 2 degrees to 20 degrees.

13. A liquid crystal display apparatus as defined in claim 10, wherein said substrate extension means is bent with a radius of curvature in a range of 10 mm to 100 mm.

14. A liquid crystal display apparatus as defined in claim 10, wherein said assembling means includes a supporting means, assembly frame having a surface contacting said second substrate means and a rise at one end which engages a rim of said substrate extension means such that said substrate extension means is bent in a direction towards said second substrate means.

15. A liquid crystal display apparatus as defined in claim 10, wherein said assembling means includes a supporting means, assembling frame including a surface contacting said first substrate means and, at one end, a slope having an angle from 2 degrees to 20 degrees, said slope bending said substrate extension means in a direction towards said second substrate means.

16. A liquid crystal display apparatus as defined in claim 15, wherein said assembling means includes a housing means for securing said substrate extension means.

17. A liquid crystal display apparatus as defined in claim 10, wherein said assembling means includes a supporting means, said supporting means including a surface contacting said first substrate means and, at one end, a curve having a radius of curvature in a range of 10 mm to 100 mm, said curve bending said substrate extension means in a direction towards said second substrate means.

18. A liquid crystal display apparatus as defined in claim 17, wherein said assembling means includes a housing means for securing said substrate extension means.

* * * * *